United States Patent
Chavez et al.

[11] Patent Number: 6,078,823
[45] Date of Patent: *Jun. 20, 2000

[54] MULTIPLE ANTENNA CELLULAR NETWORK

[75] Inventors: David A. Chavez, Monte Sereno; Ian L. Sayers, Redwood City; Gerald F. Sage, Mountain View, all of Calif.

[73] Assignee: Interwave Communications International Ltd., Hamilton, Bermuda

[*] Notice: This patent is subject to a terminal disclaimer.

[21] Appl. No.: 08/582,512

[22] Filed: Jan. 3, 1996

Related U.S. Application Data

[60] Provisional application No. 60/006,656, Nov. 13, 1995.

[51] Int. Cl.$^7$ ........................................... H04B 1/40
[52] U.S. Cl. ..................... 455/562; 455/101; 455/103; 455/132; 455/134; 455/422; 455/524; 455/562; 370/337; 370/347
[58] Field of Search ..................... 455/53.1, 507, 455/33.1, 422, 33.2, 436, 33.3, 562, 56.1, 524, 101, 102, 103, 104, 105, 132, 133, 134, 135, 277.1, 277.2, 88; 370/328, 332, 334, 347, 337; 375/220, 260, 347

[56] References Cited

U.S. PATENT DOCUMENTS

| | | | |
|---|---|---|---|
| Re. 34,540 | 2/1994 | Wu et al. | 455/20 |
| 5,023,900 | 6/1991 | Tayloe et al. | 455/424 |
| 5,235,615 | 8/1993 | Omura | 375/200 |
| 5,243,598 | 9/1993 | Lee | 455/436 |
| 5,363,428 | 11/1994 | Nagashima | 379/58 |
| 5,590,404 | 12/1996 | Sato et al. | 455/53.1 |
| 5,884,173 | 3/1999 | Söllner | 455/436 |

FOREIGN PATENT DOCUMENTS

| | | | |
|---|---|---|---|
| WO 93/10619 | 5/1993 | WIPO | H04M 11/00 |
| WO 94/05109 | 3/1994 | WIPO | H04M 11/00 |

OTHER PUBLICATIONS

Lee, "Smaller Cells for Greater Performance", *IEEE* 29(11):19–23 (1991).

Kerpez and Ariyavisitakul, "A Radio Access System with Distributed Antennas", *IEEE* 3:1696–1700 (1994).

*Primary Examiner*—Lee Nguyen
*Attorney, Agent, or Firm*—Flehr Hohbach Test Albritton & Herbert LLP

[57] ABSTRACT

A multiple antenna cellular network communicates with a mobile station over a plurality of antennas. The antennas are arranged in a plurality of positions to customize a cell or cells. A transceiver is coupled to the antennas and configured to receive inbound information from the mobile station and transmit outbound information to the mobile station. A processor is coupled to the transceiver and configured to decode the inbound information and to encode the outbound information to communicate with the mobile station. In another embodiment, the antennas are similarly deployed to create a cell or cells. The transmit signal power is continuously modified to improve quality and to move the nulls so that a fixed location user can receive a high quality signal. Exemplary embodiments are provided for use with the Global Systems for Mobile Communication (GSM) protocol and can be applied to other digital technologies.

24 Claims, 3 Drawing Sheets

MULTIPLE ANTENNA CELLULAR NETWORK

RELATED APPLICATIONS

The present application claims priority to U.S. Provisional Application No. 60/006,656, filed Nov. 13, 1995; and incorporates the following patent applications by reference: U.S. Ser. No. 08/435,709 filed May 4, 1995; U.S. Ser. No. 08/435,838 filed May 4, 1995, now U.S. Pat. No. 5,577,029; U.S. Ser. No. 08/434,597 filed May 4, 1995; U.S. Ser. No. 08/434,554 filed May 4, 1995, now U.S. Pat. No. 5,682,403; and U.S. Ser. No. 08/434,598 filed on May 4, 1995.

FIELD

The present invention relates to a multiple antenna cellular network. In particular, the invention is used in a cellular communication network to custom configure cell boundaries to accommodate obstacles such as walls, ceilings, floors and buildings to reduce interference, improve performance and improve quality of service.

BACKGROUND

Standard cellular communication networks are generally divided into geographic cells. Each cell typically contains a central antenna, is circular and overlaps slightly with adjacent cells. Base transceiver station hardware is deployed near each antenna to communicate with mobile stations in that cell. Factors that influence cellular design and the amount of deployed hardware include the number of mobile stations to be serviced in a given area, the operational power levels of the mobile stations and base stations, and the presence or absence of obstacles. Other factors include the type of communication protocol such as time division multiple access (TDMA), frequency division multiple access (FDMA), code division multiple access (CDMA), or other type. The transmit power and the communication protocol generally define the size of each cell and how many users each cell can support.

When a cellular network is designed, a specified number of users can be serviced by a specified number of cells and associated hardware including the base transceiver stations. When a mobile station passes from one cell to another, a hand-off is performed to permit the mobile station to communicate with the base transceiver station that receives the strongest signal from the mobile station. However, in some circumstances, signals are blocked by obstacles such as buildings and mountains. To accommodate these obstacles, multipath signal processing is performed, but it is not successful at all possible locations. To service all locations, additional antennas or repeaters must be deployed to create additional cells or enhance coverage even though no additional capacity may be supported. This type of hardware deployment is not efficient.

Low power cellular networks, such as those designed to service a building, have similar problems. In this case, the obstacles are walls, floors and ceilings. To accommodate these obstacles, additional antennas are deployed to create additional cells. Again, the result is that additional antenna or repeater hardware is deployed without an associated increase in the number of serviced mobile stations. Similarly, this deployment is not efficient.

Hence, one limitation of existing systems is that they require additional antenna or repeater hardware to provide service to mobile stations that move behind an obstacle. This results in a deployment of a large amount of hardware for the purpose of communicating with a statistically small number of mobile stations.

SUMMARY

The present invention relates to a multiple antenna cellular network. In particular, the invention is used in a cellular communication network to custom configure cell boundaries to accommodate obstacles such as walls, ceilings, floors and buildings to reduce interference, improve performance and improve quality of service. Exemplary embodiments are provided for use with the Global Systems for Mobile Communication (GSM) protocol and can be applied to other cellular communication and digital technologies.

A multiple antenna cellular network communicates with a mobile station over a plurality of antennas. The antennas are arranged in a plurality of positions to customize a cell or cells. A transceiver is coupled to the antennas and configured to receive inbound information from the mobile station and transmit outbound information to the mobile station. A processor is coupled to the transceiver and configured to decode the inbound information and to encode the outbound information to communicate with the mobile station.

In another embodiment, the antennas are similarly deployed to create a cell or cells. The transmit signal power is continuously varied to improve quality and to move the nulls so that a fixed location user can receive a high quality signal.

Advantages of the invention include improved cell boundary control, reduced interference, fault tolerance and more efficient use of radio resources. Additionally, mobile users will experience improved battery life because of lower mobile station transmit power requirements.

BRIEF DESCRIPTION OF THE DRAWINGS

Additional advantages of the invention will become apparent upon reading the following detailed description and upon reference to the drawings, in which.

DETAILED DESCRIPTION

The present invention relates to a multiple antenna cellular network. In particular, the invention is used in a cellular communication network to custom configure cell boundaries to accommodate obstacles such as walls, ceilings, floors and buildings to reduce interference, improve performance and improve quality of service. Exemplary embodiments are provided for use with a TDMA communication protocol and the Global Systems for Mobile Communication (GSM)

communication protocol and can be applied to other cellular communication and digital technologies. An overview of GSM is described in the U.S. patent application SPREAD SPECTRUM COMMUNICATION NETWORK WITH ADAPTIVE FREQUENCY AGILITY, U.S. Ser. No. 08/434,597, filed on May 4, 1995.

Exemplary embodiments are described herein with reference to specific configurations and protocols. For example, the embodiments are described as employing non-frequency-hopping communication, but could be implemented to frequency hop. Those skilled in the art will appreciate that various changes and modifications can be made to the exemplary embodiments while remaining within the scope of the present invention. The invention can be employed using any TDMA, FDMA, CDMA or other similar communication protocol.

HARDWARE CONFIGURATION

Figure 1:
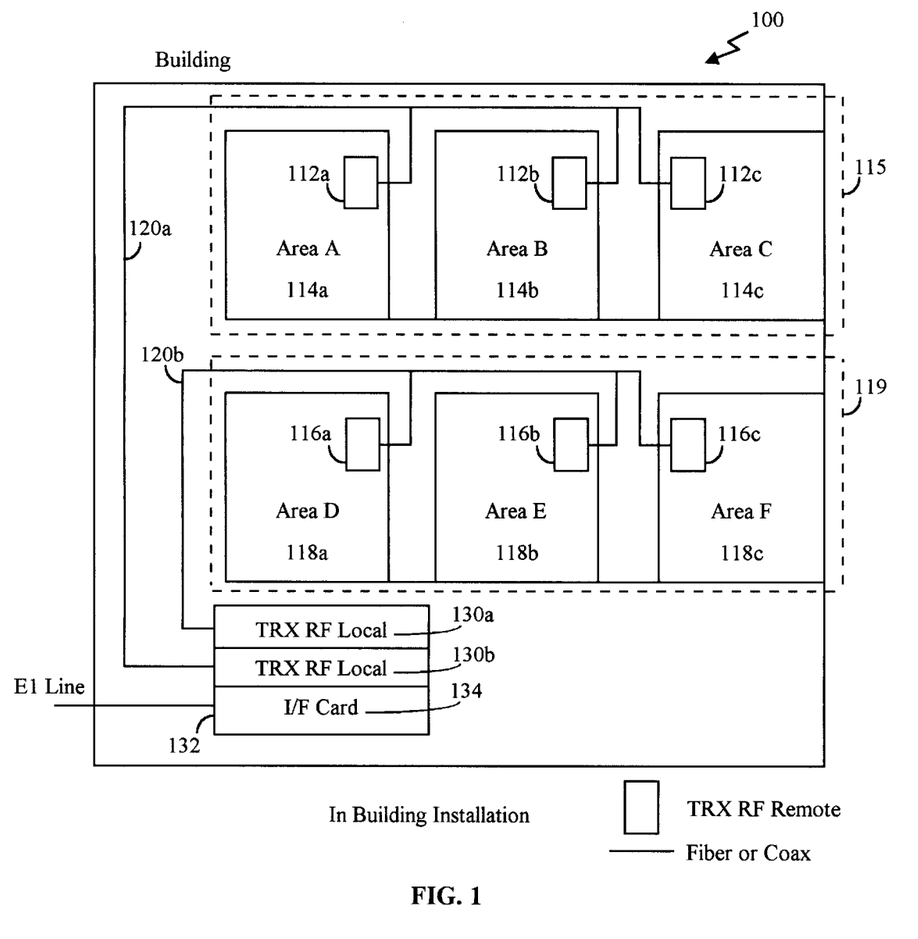
FIG. 1 depicts a multiple antenna cellular network showing a customized cell, several remote transceivers, a local transceiver and a processor according to an embodiment of the invention.

An exemplary embodiment is described with reference to FIGS. 1 through 6. FIG. 1 is a general illustration of a multiple antenna cellular network according to an embodiment of the invention. FIG. 1 shows two cells 115 and 119 in a building installation. While the embodiment is explained with reference to cell 115 and the components thereof, the explanation is equally applicable to cell 119 and the components thereof.

A plurality of remote transceivers 112a–c are positioned at a number of locations 114a–c to develop cell 115. Each location 114a–c represents a sub-cell that develops cell 115. For example, remote transceivers 112a–c can be placed in rooms or in hallways to develop cell 115. Cell 115 has a shape that is defined by the remote transceivers 112a–c and the radiated power associated with each remote transceiver 112a–c. In this embodiment, all the remote transceivers 112a–c have common transmit and receive cycles (explained below). This makes it possible for a mobile station to move among sub-cells 114a–c within cell 115 and experience continuous high quality communication.

All remote transceivers 112a–c are coupled, via data link 120a, to a local transceiver 130a. Similarly, all remote transceivers 116a–c are coupled, via data link 120b, to a local transceiver 130b. Data links 120a–b can be coaxial cables, fiber-optic cables, or other type of communication medium such as RF links. Moreover, any number of remote transceivers can be coupled to a local transceiver. Six remote transceivers per local transceiver is a typical configuration. This configuration permits a number of remote transceivers to be positioned at a number of locations to provide a custom cell having any physical space parameters. For example, the cell can be an entire building, a single floor in a building, a half floor in a building, a block of buildings, or any other physical space parameters.

Local transceivers 130a–b are mounted on printed circuit boards that fit into a housing 132 and communicate over a backplane with a communication interface card 134 such as an E1 interface card. Any number of local transceivers can be placed into the housing 132 to increase the number of available cells communicating through the E1 communication interface 134. Six local transceivers per housing is a typical configuration. Moreover, additional E1 cards can be added to boost communication throughput. While this embodiment uses an E1 card, any communication interface can be used with the invention such as a T1, PSTN, Ethernet, ISDN or other type communication interface.

Two basic network configurations are anticipated: a bus configuration, where each remote transceiver taps onto a cable; and a star configuration, where each remote transceiver is connected via an independent cable. For example, an in-building system can use a bus configuration where a single local transceiver is connected to multiple remote transceivers attached to a single bus. A star configuration, on the other hand, is configured to connect local transceivers to multiple remote transceivers using a dedicated cable for each remote transceiver. The actual implementation will depend on various factors including the cell physical space parameters, the number of mobile stations that each cell must support and the addressing technique that is used to identify the remote transceivers and to track the mobile stations.

In the exemplary embodiment depicted in FIG. 1, the configuration is a bus configuration and each remote transceiver 112a–c has an encoded address so that the local transceiver 130a can identify the inbound information from the specific remote transceiver. The mobile station communication frequencies, and inbound and outbound TDMA time slots are assigned to the mobile station upon call initialization and the mobile station can move among sub-sells 114a–c in cell 115 while remaining on the same communication frequencies. Remote transceivers 112a–c all receive the inbound information from the mobile station and process the inbound information to determine which one has the strongest signal. Then, the remote transceiver with the strongest signal communicates the inbound information to the local transceiver 130a via data link 120a. Outbound information is simultaneously transmitted by all remote transceivers 112a–c to the mobile station on the assigned outbound frequency and during the assigned outbound TDMA time slot.

INFORMATION PROCESSING

Inbound information is received by all of remote transceivers 112a–c and outbound information is transmitted by all the remote receivers 112a–c. The inbound information must be processed in an orderly fashion to assure that the correct remote transceiver 112a–c with the strongest signal communicates the inbound information to local transceiver 130afor each TDMA time slot. Moreover, the outbound information must be processed in an orderly fashion to assure that the correct power levels are transmitted according to a predefined method for each TDMA time slot.

Figure 2:
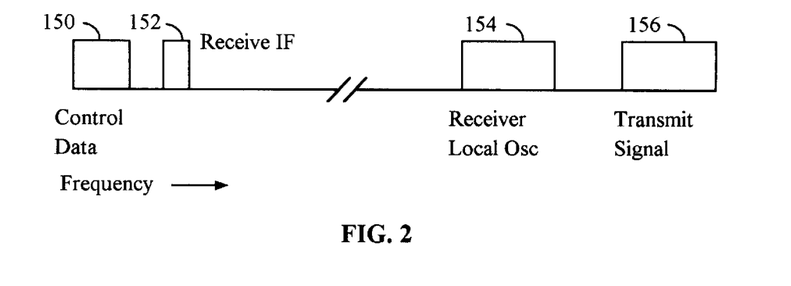
FIG. 2 depicts the communication frequency spectrum between a remote transceiver and a local transceiver according an to an embodiment of the invention.

FIG. 2 shows the frequency allocation for the data link 120. Reference 150 is the control information frequency between remote transceivers 112a–c and local transceiver 130a. The control information is depicted in greater detail in FIG. 3 which shows three general divisions A, B and C. Division A is a communication from the local transceiver to the remote transceivers. Division A has a 2 byte preamble, a 1 byte receiver select and a 6 byte transmit power level. The receiver select byte identifies which remote transceiver is selected to communicate the inbound information for the following inbound information time slot. The transmit power level 6 bytes informs the remote transceivers what power level to transmit. Division B is a 1 byte delay allowing the RSSI measurement. Division C is a communication from the remote transceivers to the local transceiver. Division C has 6 bytes that communicate the RSSI levels from the remote transceivers to the local transceiver for each of the remote transceivers. While division C is shown to have 6 bytes, division C can be modified to include a greater or lesser number of bytes to accommodate a greater or lesser number of remote transceivers. The control information including divisions A, B and C takes 576 $\mu$s for a complete transfer. Each byte includes 1 start bit and 2 stop bits for 11 bits per byte of data. The result is a minimum bit period of 3.27 μs.

FIG. 2 further shows reference 152 as the inbound information frequency. This is the frequency that the selected remote transceiver will use to communicate the inbound information to the local transceiver for the inbound information time slot. Reference 154 is a oscillator frequency that keeps the remote transceiver and local transceiver synchronized. Reference 156 is the outbound information frequency. This is the frequency that the local transceiver uses to communicate outbound information to the remote transceivers.

Figure 4:
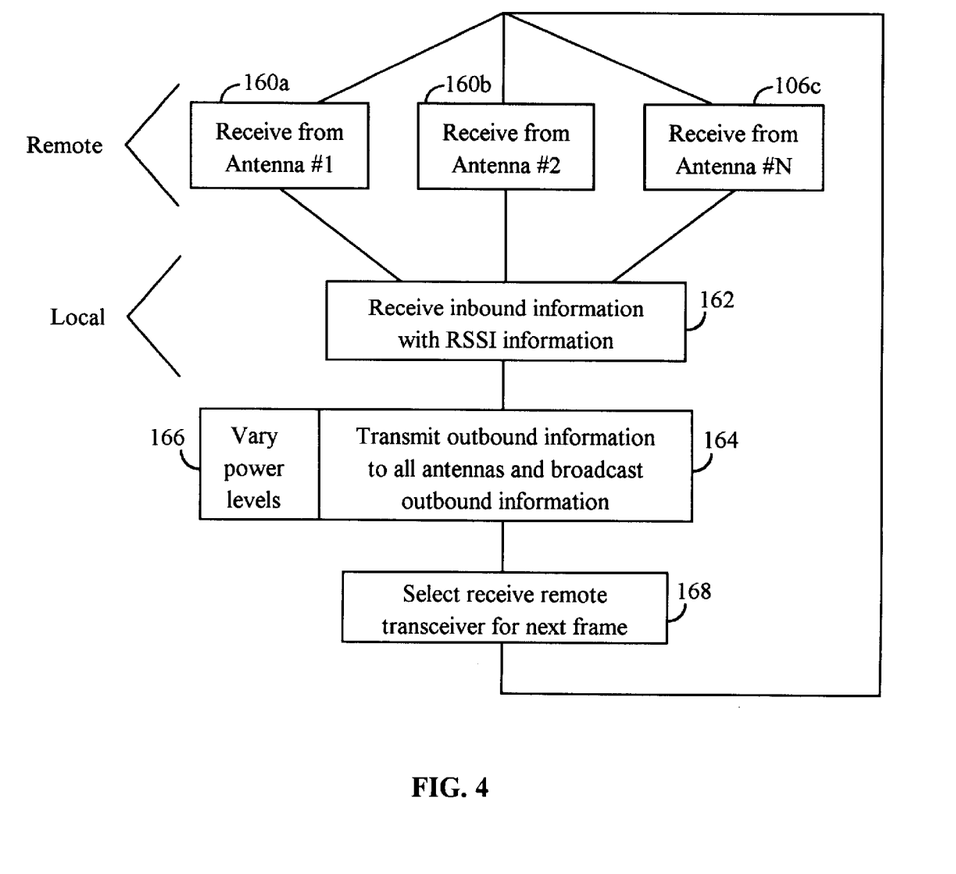
FIG. 4 is a flow chart showing operation of a multiple antenna cellular network according to an embodiment of the invention.

A flowchart operation for the exemplary embodiment is depicted in FIG. 4. This flowchart depicts a number of procedures that include inbound information processing and outbound information processing. In steps 160a–c all remote transceivers 112a–c receive inbound information from all mobile stations in the cell and measure the received signal strength. In step 162, the selected remote transceiver passes inbound information to local transceiver 130a and all the remote transceivers pass RSSI information to local transceiver 130a, for each time slot of the TDMA frame. Local transceiver 130a determines which remote transceiver 112a–c has the greatest signal strength for each received signal. When a mobile station moves into another sub-cell 114a–c (within the same cell 115), a stronger receive signal will be observed from a different remote transceiver. The local transceiver will note that a new remote transceiver should be used as the receiver, and the old remote receive should be discontinued. The local transceiver makes a decision to transfer remote transceivers on the next TDMA frame.

In step 164, local transceiver 130a sends outbound information to all remote transceivers 112a–c. Along with the outbound information is power level information depicted in FIG. 3 division A. Local transceiver 130a will vary the power levels for each remote transceiver 112a–c every TDMA frame in order to physically move the nulls. In step 168, the new remote transceiver is notified of its selection for a particular received time slot for the next TDMA frame. Step 168 then returns the process to the beginning (steps 160a–c).

The procedures described in the FIG. 4 flowchart are now described with reference to an exemplary remote transceiver 112 and exemplary local transceiver 130.

INBOUND INFORMATION PROCESSING

Figure 5:
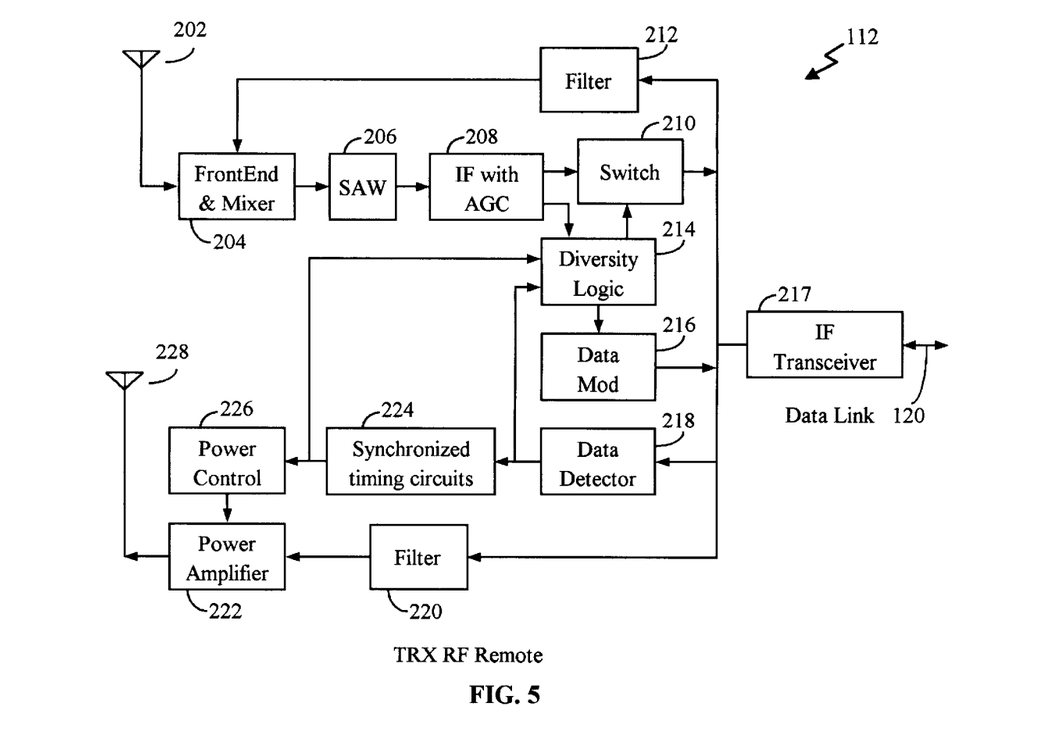
FIG. 5 is a schematic of a remote transceiver according to an embodiment of the invention.

FIG. 5 depicts a remote transceiver 112. A plurality of remote transceivers 112a–c are designed for deployment at various locations 114a–c to construct cell 115. Remote transceiver 112 includes a receive antenna 202 to receive an inbound signal containing inbound information from the mobile stations. This corresponds to flowchart step 160. Each mobile station is assigned a transmit TDMA time slot and instructed to transmit on a particular frequency. For example, the GSM base station receive band (corresponding to the mobile station transmit band) is from 890–915 MHz, in 200 KHz increments.

Once the inbound signal is received from the mobile station, a front end mixer 204 begins the down-conversion. Mixer 204 receives its local oscillator (LO) input signal from filter 212, which receives its input from local transceiver 130 via an analog link over cable 120. A surface acoustic waveform (SAW) filter 208 continues the down-conversion process. The result is an inbound intermediate frequency (IF) signal of approximately 10.7 MHz. An automatic gain control 208 serves to maintain the IF signal at a consistently high level. The IF signal is then provided to both a switch 210 and a diversity logic circuit 214.

Switch 210 is set in the previous frame by the local transceiver 130. Switch 210 is set so that the remote transceiver with the greatest signal strength will be selected to deliver the inbound information from the mobile station allocated to the specified inbound time slot. That is, each remote transceiver sets its switch 210 with respect to each time slot in the TDMA frame. For example, if a particular remote transceiver had the greatest signal strength for mobile stations allocated to time slots one and four, that remote transceiver would set its switch 210 to permit the IF for time slots one and four to be transmitted over the data link 120.

Figure 3:
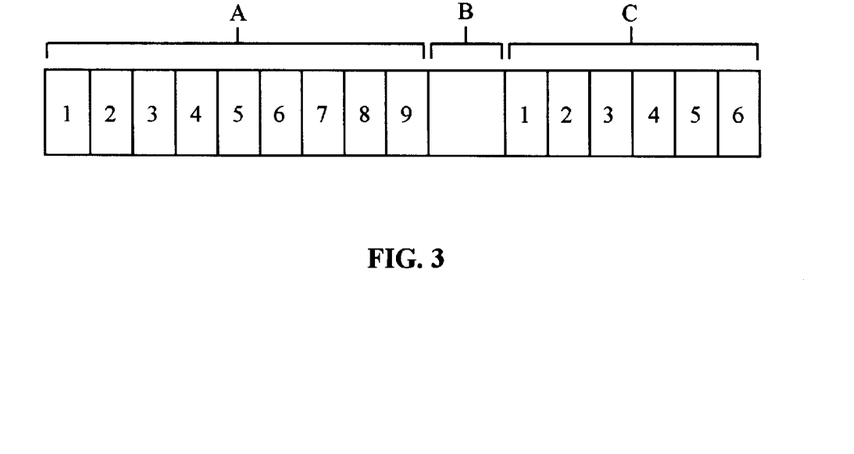
FIG. 3 is a control data word communicated between a remote transceiver and a local transceiver according to an embodiment of the invention.

Diversity logic circuit 214 measures the inbound signal strength and generates a received signal strength indicator (RSSI) for each inbound signal for each time slot. This corresponds to flowchart step 162. Diversity logic circuit 214 receives a synchronization signal from synchronized timing circuits 224 in order to properly gather the RSSI information. The RSSI information is digitized and modulated by data modulator 216. The RSSI information is encoded into a data word and transmitted via IF transceiver 217 to local transceiver 130 for every reception, as shown in FIG. 3. As shown, the data word employs 16 bytes with 6 bytes (C1–C6) for communicating RSSI information from remote transceivers 112 to local transceiver 130 via data link 120. Thus, up to six remote transceivers can be supported in each exemplary cell. Of course, more remote transceivers can be configured in alternate embodiments.

Figure 6:
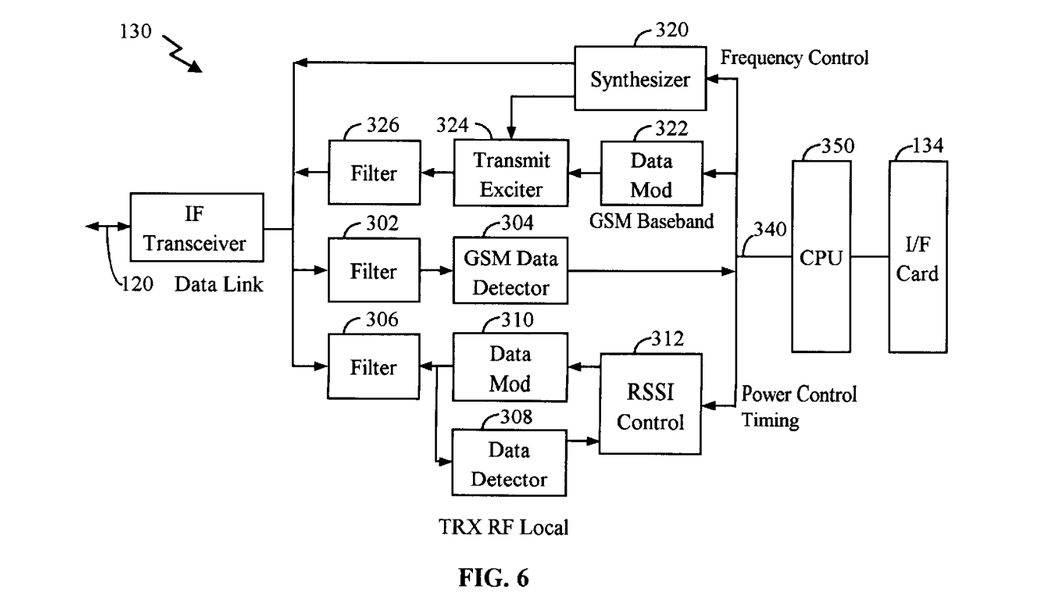
FIG. 6 is a schematic of a local transceiver according to an embodiment of the invention.

FIG. 6 depicts local transceiver 130 where inbound information is received over data link 120 via IF transceiver 301 and filtered by filters 302 and 306. Filter 302 has a center frequency of approximately 10.7 MHz, while filter 306 has a center frequency of approximately 48 MHz.

Filter 302 passes the inbound information to a GSM data detector 304 that communicates directly with CPU 350. A signal processing function to decode the inbound information is performed by CPU 350. Alternatively, a signal processor can be employed to decode the inbound information. Once CPU 350 has decoded the inbound information, CPU 350 transmits the inbound information to E1 card 134, which transmits the information to a base station controller (BSC), mobile services center (MSC), PBX, or other similar telephone network.

Filter 306 passes inbound RSSI information to a data detector 308. RSSI control 312 receives the RSSI information and determines which remote transceiver has the greatest received signal strength, further corresponding to flowchart step 162. RSSI control 312 stores the RSSI information to select the inbound information from the remote transceiver receiving the strongest signal. The selection is performed at the next frame by sending the selection information (FIG. 3 division A) outbound via control information data modulator 310 and setting switch 210 in the selected remote transceiver 112. This corresponds to flowchart step 168. This step permits RSSI control 312 to control reception from the mobile stations on a frame by frame basis. At the next frame interval, RSSI control 312 will instruct the remote transceiver with the strongest RSSI (from the last frame) to operate its switch 210 to place the inbound information on the data link 120.

OUTBOUND INFORMATION PROCESSING

Outbound information is received from a remote network via E1 card 134. CPU 350 encodes the outbound information in preparation for transmission to the mobile stations. In this embodiment, corresponding to flowchart step 164, all remote transceivers simultaneously broadcast the outbound information to the mobile stations. This insures reception by the intended mobile station and reduces control complexity. However, individual transmission by selected remote transceivers is anticipated in an alternate embodiment.

For the outbound communication, similar to the inbound communication, each mobile station is assigned a receive TDMA time slot and instructed to receive on a particular frequency. For example, the GSM base station transmit band (corresponding to the mobile station receive band) is from 935–960 MHz, in 200 KHz increments.

CPU 350 delivers the encoded outbound information to synthesizer 320 and data modulator 322. Both these circuits communicate to a transmit exciter 324 that passes the information to filter 326 and then to remote transceiver 112.

A problem that arises during simultaneous transmission of the outbound information is interference. Since every remote transmitter transmits the outbound information, overlaps will occur at various locations causing standing nulls where no power is received by a mobile station. Standing nulls are especially problematic in office settings where a mobile station may stay in a single location for a period of time, such as at a desk. To alleviate the problem of standing nulls, the outbound signal power is varied on a frame by frame basis. This is accomplished by sending a diversity control signal to the remote transceivers that controls the remote transceiver transmit power. This corresponds to flowchart step 166 and is included in the control information of FIG. 3 division A. By altering the transmit power on a frame by frame basis, nulls are physically moved on a frame by frame basis. Thus, in operation single frame may be lost because the mobile station is located at a null, but the next frame will be received because the null is moved away from the previous null where the mobile station is located. In this manner, data loss due to nulls is practically eliminated because known error correction codes can reconstruct a complete message with loss of information from a single frame.

Once remote transceiver 112 receives the outbound information, filter 220 receives the outbound information and passes it to power amplifier 222. Simultaneously, data detector 218 receives the outbound information from local transceiver 130, and passes that information to a synchronized timing circuit 224. Timing circuit 224 then adapts power control circuit 226 to vary the output power level on a frame by frame basis as instructed by diversity control 312 (encoded in the data word). This modification of power levels serves to move nulls and to promote high quality communication with a fixed location mobile station.

CONCLUSION

Advantages of the present invention include improved cell boundary control, reduced interference, fault tolerance, and more efficient use of radio resources. Additionally, mobile users will experience improved battery life because of lower mobile station transmit power requirements.

Having disclosed exemplary embodiments and the best mode, modifications and variations may be made to the disclosed embodiments while remaining within the scope of the present invention as defined by the following claims.

What is claimed is:

1. A multiple antenna cellular network for communicating with a plurality of mobile stations within a cell, comprising:

a plurality of remote transceivers each having a respective antenna and positioned at predetermined spaced apart locations to produce the cell, said remote transceivers configured to receive inbound information from said mobile stations and to transmit outbound information to said mobile stations, where each remote transceiver is configured to communicate with mobile stations in communication proximity to said respective antenna, and where each remote transceiver includes a receive channel having a down-converter, a received signal strength measurement circuit configured to measure inbound information signal strength and generate a received signal strength value, and a switch to selectively allow or disallow transmission of said inbound information to an output port;

a local transceiver coupled to said output port of each of said remote transceivers and configured to receive said received signal strength value from each of said remote transceivers, to selectively set said switch in a selected remote transceiver based on predetermined criteria to allow said selected remote transceiver to transmit said inbound information to said local transceiver, and to transmit said outbound information to at least one of said remote transceivers; and a processor coupled to said local transceiver and to an external port and configured to process said inbound information and outbound information to conform said inbound information for communication with said external port and to conform said outbound information for communication with said mobile stations.

2. The multiple antenna cellular network of claim 1, wherein:

said local transceiver is configured to communicate substantially identical outbound information to a multiplicity of said remote transceivers; and said multiplicity of remote transceivers are configured to simultaneously transmit said substantially identical outbound information.

3. The multiple antenna cellular network of claim 2, wherein:

said multiplicity of remote transceivers are configured to transmit said substantially identical outbound information at a substantially identical frequency; and said multiplicity of remote transceivers are configured to periodically vary outbound information output power to move nulls in the cell.

4. The multiple antenna cellular network of claim 1, wherein:

said local transceiver is configured to selectively set said switch in a selected remote transceiver having a greatest received signal strength value.

5. The multiple antenna cellular network of claim 1, wherein:

said remote transceivers are configured to communicate with said mobile stations using a time division multiple access protocol having frames including a plurality of time slots;

said remote transceivers are configured to generate said received signal strength value for each of said frames; and said local transceiver is configured to selectively set said switch in a selected remote transceiver having a greatest received signal strength value, whereby:

(a) a remote transceiver having a greatest received signal strength value during a first frame is configured to communicate said inbound information to said local transceiver during a first time period; and (b) a remote transceiver having a greatest received signal strength value during a second frame is configured to communicate said inbound information to said local transceiver during a second time period.

6. The multiple antenna cellular network of claim 1, wherein:

each of said remote transceivers includes an RF transceiver to communicate information with said mobile stations and an IF transceiver coupled to said output port to communicate IF information with said local transceiver, said IF information including both inbound information and control information wherein said inbound information is assigned to a set of time slots at a first IF frequency and said control information is assigned to a set of time slots at a second IF frequency, said control information including received signal strength values and selective switch settings; and said local transceiver includes an IF transceiver to communicate IF information with said remote transceivers and an interface circuit to communicate information with said processor.

7. The multiple antenna cellular network of claim 6, wherein:

said local transceiver is configured to communicate substantially identical outbound information to a multiplicity of said remote transceivers; and said multiplicity of remote transceivers are configured to simultaneously transmit said substantially identical outbound information.

8. The multiple antenna cellular network of claim 7, wherein:

said multiplicity of remote transceivers are configured to transmit said substantially identical outbound information at a substantially identical frequency; and said multiplicity of remote transceivers are configured to periodically vary outbound information output power to move nulls in the cell.

9. The multiple antenna cellular network of claim 6, wherein:

said local transceiver is configured to selectively set said switch in a selected remote transceiver having a greatest received signal strength value.

10. The multiple antenna cellular network of claim 6, wherein:

said remote transceivers are configured to communicate with said mobile stations using a time division multiple access protocol having frames including a plurality of time slots;

said remote transceivers are configured to generate said received signal strength value for each of said frames; and said local transceiver is configured to selectively set said switch in a selected remote transceiver having a greatest received signal strength value, whereby:

(a) a remote transceiver having a greatest received signal strength value during a first frame is configured to communicate said inbound information to said local transceiver during a first time period; and (b) a remote transceiver having a greatest received signal strength value during a second frame is configured to communicate said inbound information to said local transceiver during a second time period.

11. The multiple antenna cellular network of claim 1, for further communicating with a plurality of second mobile stations within a second cell, said network further comprising:

a plurality of second remote transceivers each having a respective antenna and positioned at predetermined spaced apart locations to produce the second cell, said second remote transceivers configured to receive second inbound information from said second mobile stations and to transmit second outbound information to said second mobile stations, where each second remote transceiver is configured to communicate with second mobile stations in communication proximity to said respective antenna, and where each second remote transceiver includes a receive channel including a down-converter, a received signal strength measurement circuit configured to measure second inbound information signal strength and generate a second received signal strength value, and a switch to selectively allow or disallow transmission of said second inbound information to an output port;

a second local transceiver coupled to said output port of each of said second remote transceivers and configured to receive said second received signal strength value from each of said second remote transceivers, to selectively set said switch in a selected second remote transceiver based on predetermined criteria to allow said selected second remote transceiver to transmit said second inbound information to said second local transceiver, and to transmit said second outbound information to at least one of said second remote transceivers; and wherein said processor is coupled to said second local transceiver and configured to process said second inbound information and second outbound information to conform said second inbound information for communication with said external port and to conform said second outbound information for communication with said second mobile stations.

12. The multiple antenna cellular network of claim 11, wherein:

said local transceiver is configured to communicate substantially identical outbound information to a multiplicity of said remote transceivers;

said multiplicity of remote transceivers are configured to simultaneously transmit said substantially identical outbound information;

said second local transceiver is configured to communicate substantially identical second outbound information to a multiplicity of said second remote transceivers; and said multiplicity of second remote transceivers are configured to simultaneously transmit said substantially identical second outbound information.

13. The multiple antenna cellular network of claim 12, wherein:

said multiplicity of remote transceivers are configured to transmit said substantially identical outbound information at a substantially identical frequency;

said multiplicity of remote transceivers are configured to periodically vary outbound information output power to move nulls in the cell;

said multiplicity of second remote transceivers are configured to transmit said substantially identical second outbound information at a substantially identical frequency; and said multiplicity of second remote transceivers are configured to periodically vary outbound information output power to move nulls in the second cell.

14. The multiple antenna cellular network of claim 11, wherein:
said local transceiver is configured to selectively set said switch in a selected remote transceiver having a greatest received signal strength value; and
said second local transceiver is configured to selectively set the switch in a selected second remote transceiver having a greatest second received signal strength value.

15. The multiple antenna cellular network of claim 11, wherein:
said remote transceivers are configured to communicate with said mobile stations using a time division multiple access protocol having frames including a plurality of time slots;
said remote transceivers are configured to generate said received signal strength value for each of said frames; and
said local transceiver is configured to selectively set the switch in a selected remote transceiver having a greatest received signal strength value, whereby:
(a) a remote transceiver having a greatest received signal strength value during a first frame is configured to communicate said inbound information to said local transceiver during a first time period; and
(b) a remote transceiver having a greatest received signal strength value during a second frame is configured to communicate said inbound information to said local transceiver during a second time period;
said second remote transceivers are configured to communicate with said second mobile stations using a time division multiple access protocol having frames including a plurality of time slots;
said second remote transceivers are configured to generate said second received signal strength value for each of said frames; and
said second local transceiver is configured to selectively set the switch in a selected second remote transceiver having a greatest second received signal strength value, whereby:
(a) a second remote transceiver having a greatest received signal strength value during a first frame is configured to communicate said inbound information to said second local transceiver during a first time period; and
(b) a second remote transceiver having a greatest received signal strength value during a second frame is configured to communicate said inbound information to said local transceiver during a second time period.

16. The multiple antenna cellular network of claim 11, wherein:
each of said remote transceivers includes an RF transceiver to communicate information with said mobile stations and an IF transceiver coupled to said output port to communicate IF information with said local transceiver, said IF information including both inbound information and control information wherein said inbound information is assigned to a set of time slots at a first IF frequency and said control information is assigned to a set of time slots at a second IF frequency, said control information including received signal strength values and selective switch settings; and
said local transceiver includes an IF transceiver to communicate IF information with said remote transceivers and an interface circuit to communicate information with said processor;
each of said second remote transceivers includes an RF transceiver to communicate information with said second mobile stations and an IF transceiver coupled to said second output port to communicate IF information with said second local transceiver, said IF information including both second inbound information and second control information wherein said second inbound information is assigned to a set of time slots at said first IF frequency and said control information is assigned to a set of time slots at said second IF frequency, said control information including second received signal strength values and selective switch settings; and
said second local transceiver includes an IF transceiver to communicate IF information with said second remote transceivers and an interface circuit to communicate information with said processor.

17. The multiple antenna cellular network of claim 16, wherein:
said local transceiver is configured to communicate substantially identical outbound information to a multiplicity of said remote transceivers;
said multiplicity of remote transceivers are configured to simultaneously transmit said substantially identical outbound information;
said second local transceiver is configured to communicate substantially identical second outbound information to a multiplicity of said second remote transceivers; and
said multiplicity of second remote transceivers are configured to simultaneously transmit said substantially identical second outbound information.

18. The multiple antenna cellular network of claim 17, wherein:
said multiplicity of remote transceivers are configured to transmit said substantially identical outbound information at a substantially identical frequency;
said multiplicity of remote transceivers are configured to periodically vary said outbound information output power to move nulls in the cell;
said multiplicity of second remote transceivers are configured to transmit said substantially identical second outbound information at a substantially identical frequency; and
said multiplicity of second remote transceivers are configured to periodically vary outbound information output power to move nulls in the second cell.

19. The multiple antenna cellular network of claim 16, wherein:
said local transceiver is configured to selectively set the switch in a selected remote transceiver having a greatest received signal strength value; and
said second local transceiver is configured to selectively set the switch in a selected second remote transceiver having a greatest second received signal strength value.

20. The multiple antenna cellular network of claim 16, wherein:
said remote transceivers are configured to communicate with said mobile stations using a time division multiple access protocol having frames including a plurality of time slots;
said remote transceivers are configured to generate said received signal strength value for each of said frames; and
said local transceiver is configured to selectively set the switch in a selected remote transceiver having a greatest received signal strength value, whereby:

(a) a remote transceiver having a greatest received signal strength value during a first frame is configured to communicate said inbound information to said local transceiver during a first time period; and (b) a remote transceiver having a greatest received signal strength value during a second frame is configured to communicate said inbound information to said local transceiver during a second time period;

said second remote transceivers are configured to communicate with said second mobile stations using a time division multiple access protocol having frames including a plurality of time slots;

said second remote transceivers are configured to generate said second received signal strength value for each of said frames; and said second local transceiver is configured to selectively set the switch in a selected second remote transceiver having a greatest second received signal strength value, whereby:

(a) a second remote transceiver having a greatest received signal strength value during a first frame is configured to communicate said inbound information to said second local transceiver during a first time period; and (b) a second remote transceiver having a greatest received signal strength value during a second frame is configured to communicate said inbound information to said local transceiver during a second time period.

21. A method of communicating with a plurality of mobile stations within a cell using a multiple antenna cellular network having a plurality of remote transceivers each having a respective antenna and positioned at predetermined spaced apart locations to produce the cell and configured to receive inbound information from said mobile stations and transmit outbound information to said mobile stations, and where each remote transceiver includes a receive channel having a received signal strength measurement circuit configured to measure inbound information signal strength and generate a received signal strength value, and a switch to selectively allow or disallow transmission of said inbound information to an output port, a local transceiver coupled to said output of each of said remote transceivers and to a processor configured to process said inbound information and outbound information, said method comprising the steps of:

receiving inbound information at the remote transceivers;

measuring inbound information power levels from said mobile stations at each of said remote transceivers and generating a received signal strength value;

communicating said received signal strength values to said local transceiver;

determining in said local transceiver a selected remote transceiver meeting a predetermined criteria based on said received signal strength values and transmitting to said selected remote transceiver a selective switch setting;

setting the switch in said selected remote transceiver to allow communication of said inbound information to said local transceiver; and transmitting said inbound information from said selected remote transceiver to said local transceiver.

22. The method of claim 21, further comprising the steps of:

communicating substantially identical outbound information from said local transceiver to a multiplicity of said remote transceivers;

simultaneously transmitting said substantially identical outbound information from said multiplicity of remote transceivers at a substantially identical frequency; and periodically varying an outbound information output power of said remote transceivers to move nulls in the cell.

23. The method of claim 21, wherein said remote transceivers are configured to communicate with said mobile stations using a time division multiple access protocol having frames including a plurality of time slots; and wherein:

said measuring step includes the steps of measuring inbound information power levels from said mobile stations and generating said received signal strength value for each of said frames; and said determining step includes the step of selecting a remote transceiver having a greatest received signal strength value, whereby:

(a) a remote transceiver having a greatest received signal strength value during a first frame is configured to communicate said inbound information to said local transceiver during a first time period; and (b) a remote transceiver having a greatest received signal strength value during a second frame is configured to communicate said inbound information to said local transceiver during a second time period.

24. The method of claim 23, further comprising the steps of:

communicating substantially identical outbound information from said local transceiver to a multiplicity of said remote transceivers;

simultaneously transmitting said substantially identical outbound information from said multiplicity of remote transceivers at a substantially identical frequency; and periodically varying an outbound information output power of said remote transceivers to move nulls in the cell.

* * * * *